United States Patent [19]
Sinclair et al.

[11] 4,001,705
[45] Jan. 4, 1977

[54] LIGHT SCANNING DEVICE

[76] Inventors: Brett Jason Sinclair, 150-11 72nd Road, Flushing, N.Y. 11367; Harold Youngelson, 647 Academy St., New York, N.Y. 10034

[22] Filed: May 20, 1975

[21] Appl. No.: 579,271

[52] U.S. Cl. .......................... 330/4.3; 331/94.5 C; 332/7.51; 350/96 B
[51] Int. Cl.² .......................................... H01S 3/00
[58] Field of Search .................. 330/4.3; 332/7.51; 331/94.5 C, 94.5 K; 350/96 B, 292, 299, DIG. 2

[56] References Cited
UNITED STATES PATENTS

| | | | |
|---|---|---|---|
| 3,289,101 | 11/1966 | Masters et al. | 330/4.3 |
| 3,427,456 | 2/1969 | Caulfield | 331/94.5 K |
| 3,895,313 | 7/1975 | Saitz | 331/94.5 C |

FOREIGN PATENTS OR APPLICATIONS

| | | | |
|---|---|---|---|
| 260,856 | 11/1926 | United Kingdom | 350/299 |

*Primary Examiner*—Nelson Moskowitz
*Attorney, Agent, or Firm*—Peter L. Tailer

[57] ABSTRACT

A scanning device has mirrors which reflect a beam of light between them to pass successively through the lasing medium of a laser. The beam is slightly deflected on each path between the mirrors to scan a pattern and the beam is amplified with each passage through the laser. One mirror is partially reflective and partially transparent so the pattern determined by the reflective path of the light beam between the mirrors passes beyond the mirrors to be modulated for information storage, information retrieval, and other uses. One embodiment of the invention has two parallel mirrors with the beam slightly angled to be reflected back and forth along a row and wedge shaped deflectors fixed to the mirrors to shift the beam to another row so that the beam scans a pattern as it emerges from one of the partially transparent mirrors.

5 Claims, 8 Drawing Figures

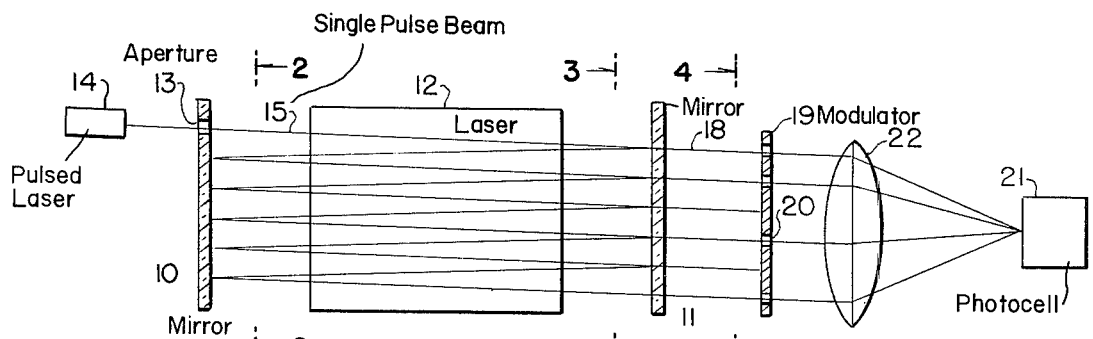
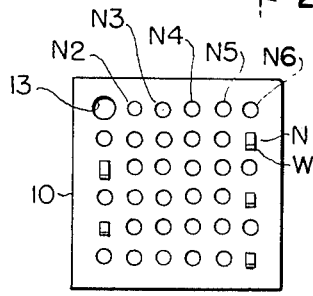
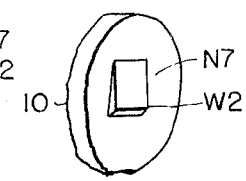
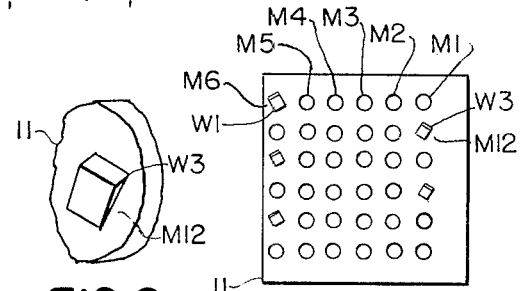
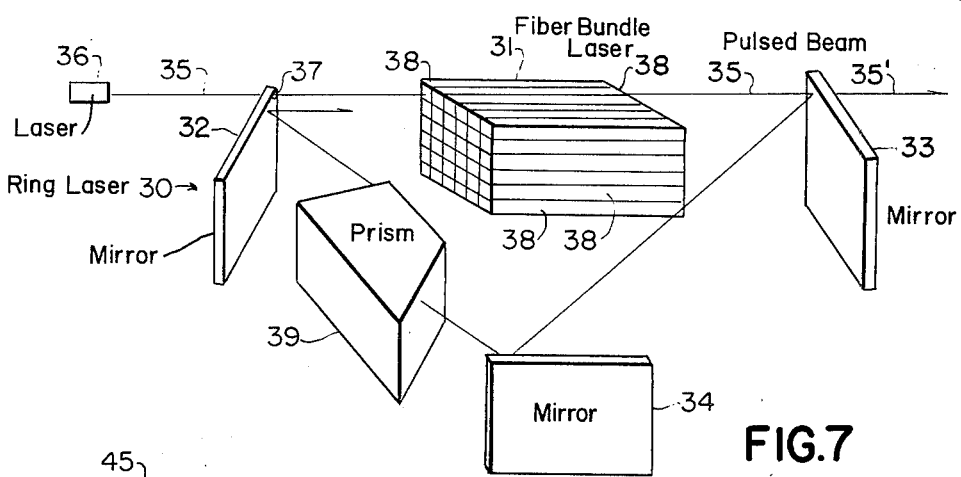
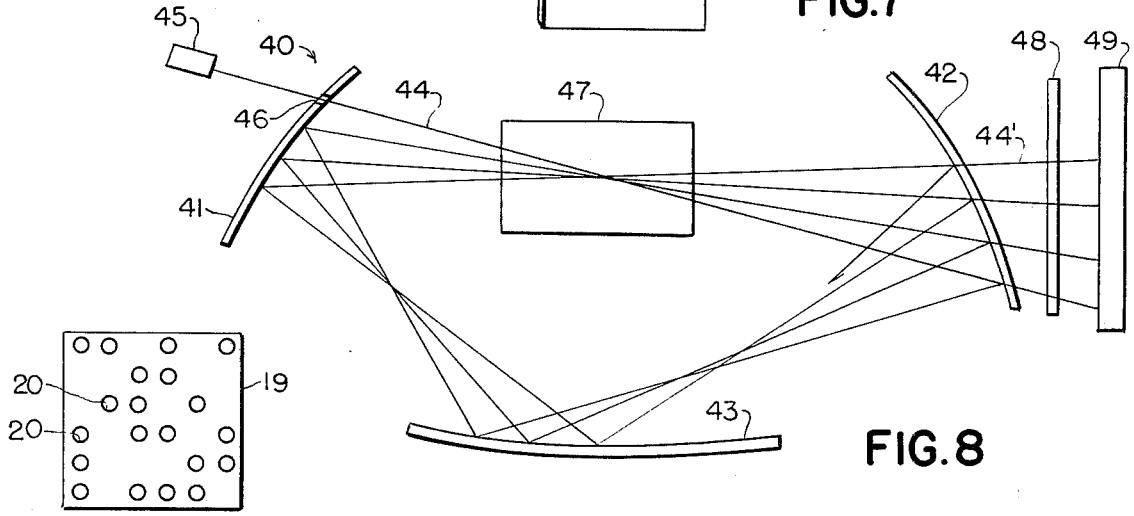

LIGHT SCANNING DEVICE

BRIEF DESCRIPTION OF THE DRAWING

FIG. 1 is a top view of a light scanning device according to a first embodiment of our invention with mirrors and a modulator shown in horizontal section;

FIG. 2 is a view taken on line 2—2 of FIG. 1;

FIG. 3 is a view taken on line 3—3 of FIG. 1;

FIG. 4 is a view taken on line 4—4 of FIG. 1;

FIG. 5 is a perspective view of a fragment of the mirror of FIG. 2;

FIG. 6 is a perspective view of a fragment of the mirror of FIG. 3;

FIG. 7 is a perspective view of a second embodiment of our invention showing a fiber optic bundle laser in a ring laser configuration; and FIG. 8 is a top view of a third embodiment of our invention.

DESCRIPTION OF THE PREFERRED EMBODIMENTS

Referring to FIGS. 1–6, a first embodiment of our invention has two flat mirrors 10 and 11 disposed parallel to each other. Between mirrors 10 and 11 there is disposed a laser 12. Laser 12 could be, as examples, any high gain gas laser having a lasing medium such as a $CO_2$ laser or it could be a semi-conductor laser such as a GaAs laser.

Mirror 11 is largely reflective, but it is also partly transparent to pass some light. For example, it could be 99 percent reflective and 1 percent transparent to pass 1 percent of the light received therethrough. Mirror 10 contains a transparent portion or a small aperture 13 in one corner. A pulse laser 14, or any equivalent device, sends a single pulse beam 15 through aperture 13 at a slight angle in the horizontal plane as shown.

Referring to FIGS. 2 and 3, beam 15 is reflected back and forth between mirrors 10 and 11. Beam 15 is first reflected from area M1 of mirror 11, then from area N2 of mirror 10, and then from areas M2, N3, M3, N4, M4, N5, and N6 to M6. Area M6 has a small wedge shaped reflective surface W1 fixed thereto to reflect beam 15 from mirror 11 at the same angle in the vertical plane at which it was received and to reflect it slightly downward. Beam 15 then strikes area N7 of mirror 10 which has a wedge shaped reflective surface W2 fixed thereto to reflect beam 15 horizontally to be further reflected between mirrors 10 and 11 through another horizontal zigzag path in a lower plane. When wedge shaped reflective surface W3 is reached as shown in FIGS. 3 and 6, the beam 15 is again reflected downward. Reflective surface W2 is shown in FIG. 5.

Each time beam 15 passes through laser 12, it is amplified to prevent its decay before traversing the entire path set up between the mirrors 10 and 11. Since mirror 11 is partially transparent, a pulsed array 18 of beams 15 will emerge therefrom. While the actual duration of the pulse of the beam 15 may vary, the beams 15 of array 18 will emerge sequentially from mirror 11 according to the time it takes beam 15 to travel from mirror 11 through laser 12 to be reflected from mirror 10 and again pass through laser 12 to again strike mirror 11 and again emerge therefrom. Since this time interval is very small, the rate of scanning the array 18 is very fast.

As may be additionally seen in FIG. 4, a modulator 19 may be negative film with exposed areas 20 or an opaque plate with apertures 20. The emerging light pulses from modulator 19 may be focused on a fast photo cell 21 by any suitable lens system 22. Photo cell 21 may be an organic die cell or the like.

If the beam 15 spreads, it may be collimated by any suitable optical system (not shown) placed in its path. This is well known and may be accomplished in many ways known in the art. If beam 15 is kept under 10 microns in diameter, a 10 cm. by 10 cm. modulator can store a million bits of information. Thus this invention provides a quantitatively superior information storage device with an unmatched retrieval rate.

FIG. 7 shows a ring laser 30 with a fiber optic bundle laser 31 and three mirrors 32, 33, and 34 placed to direct a pulsed beam 35 of light from a laser 36 passing through aperture 37 successively through each fiber optic 38 of bundle 31. The flat mirrors 32, 33, and 34 are at angles to each other totalling 180° and laser 36 directs beam 35 at a slight angle to pass through each fiber optic 38 in the upper layer in turn. Wedge shaped reflective surfaces, similar to those shown in the first embodiment of the invention direct beam 35 to lower layers. A butterfly prism 39 or its equivalent inverts the path of beam 35 to scan fiber optic elements 38 in one horizontal plane. If one mirror 32, 33, or 34 is partially transparent, beams 35' emerging therefrom will scan a modulator 19 as in the first embodiment of our invention.

Referring now to FIG. 8, a ring laser 40 has three curved mirrors 41, 42, and 43 that direct a pulsed beam 44 from laser 45 through a notch 46 in mirror 41 in a path that passed through laser 47 for amplification of beam 44. The beam 44 moves its areas of contact with the mirrors 41, 42, and 43 with each path, but with each path, the beam 44 only changes its direction of passage in one plane through laser 47. Laser 47 may be a high gain gas laser such as a $CO_2$ laser. A suitable collimating device (not shown), wedge shaped reflecting areas, or any equivalent may displace the beam 44 along the axes of the mirrors 41, 42, and 43. Thus beam 44 sequentially emerges as an array 44' through the partially transparent mirror 42.

A Kerr cell 48 controlled by a suitable high speed device may act as a modulator to selectively pass the array 44' of beams to strike a photosensitive plate 49 and record an image. With sufficient power, array 44' could burn a surface of a paper 49 to directly print upon it without ink.

Other devices besides partially transparent mirrors could be used to direct an array of scanning beams from the path set by given mirrors and an amplifying laser. The amplifying laser need not amplify each pulse of light passing through it. Many uses can be found for the light scanning device of our invention, and many modifications in its structure will suggest themselves to those skilled in the art. The embodiments shown are merely exemplary and modifications may be made without departing from the spirit and scope of the invention.

The fiber optic bundle laser 31 is a bundle of individual fiber optic lasers 38 bundled together. The lasers 12, 31, and 47 are suitably excited.

We claim:

1. A light scanning device comprising, in combination, mirrors set to reflect a beam of light therebetween, a laser having a lasing medium in the path of light between at least two of said mirrors, means introducing a pulse beam between said mirrors, said mirrors reflecting said beam therebetween with said beam with each passage between said mirrors being slightly deflected, means directing a portion of said beam from between said mirrors to thereby direct a sequential pattern of light beams from said scanning device, said lasing medium amplifying said beam during reflection between said mirrors, and a modulator modifying the sequential pattern of light beams directed from said light scanning device.

2. The combination according to claim 1 wherein said mirrors are two flat parallel mirrors with said lasing medium therebetween, and wherein said means introducing a pulsed beam of light between said mirrors introduces said beam at a slight angle so that said beam is displaced laterally as it is reflected back and forth between said mirrors.

3. The combination according to claim 2 with the addition of means displacing said beam downward, said beam subsequently being displaced laterally at lower levels.

4. The combination according to claim 3 wherein said means displacing said beam downward are wedge shaped reflecting surfaces on said mirrors.

5. The combination according to claim 1 wherein said laser is a fiber optic bundle laser having an array of fibers, said beam being reflected by said mirrors to pass successively through said fibers of said bundle.

* * * * *